Oct. 9, 1962     H. LÜTHI     3,057,289
STRAPPING APPARATUS

Filed Feb. 21, 1956     10 Sheets-Sheet 1

INVENTOR:
Hans Lüthi

INVENTOR:
Hans Lüthi

Oct. 9, 1962  H. LÜTHI  3,057,289
STRAPPING APPARATUS
Filed Feb. 21, 1956  10 Sheets-Sheet 4
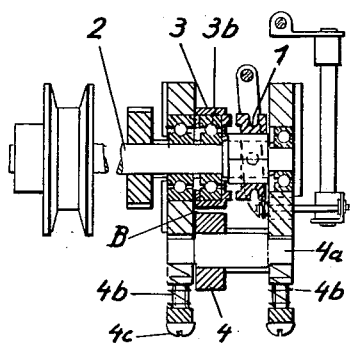
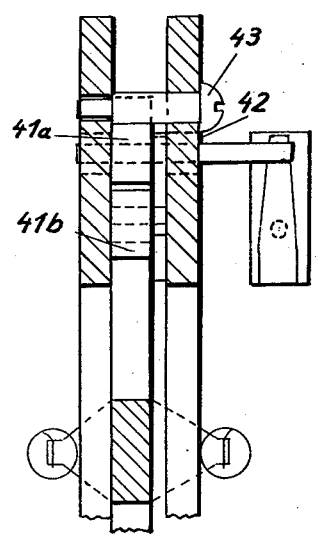
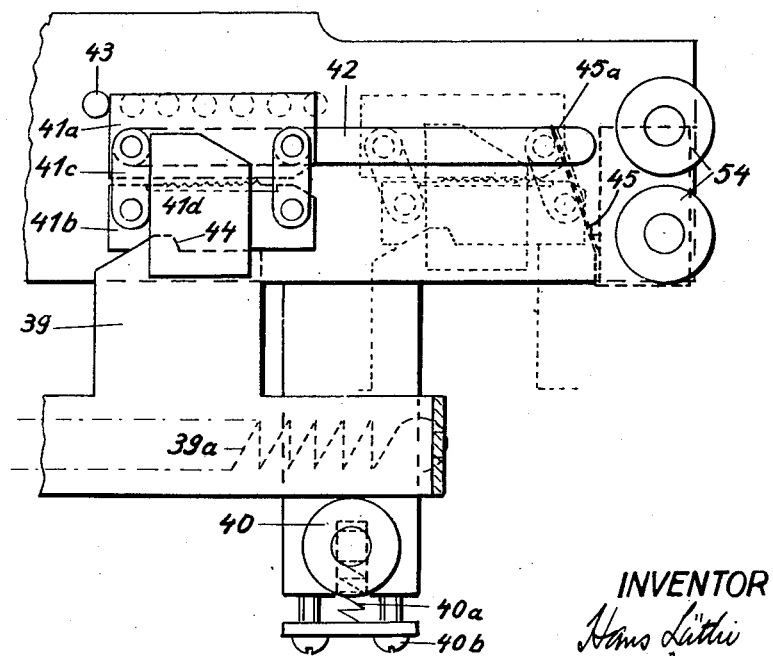
INVENTOR:
Hans Lüthi
by [signature]
Attorney

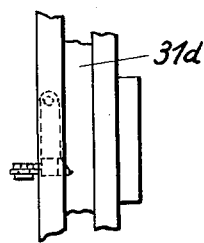
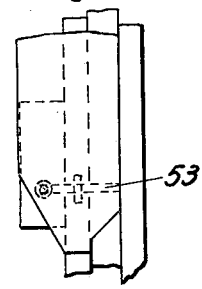
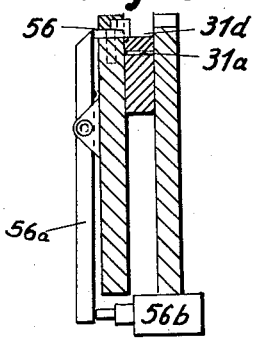
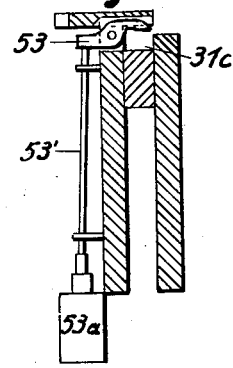
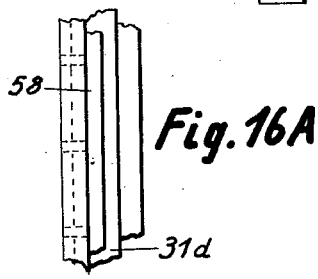
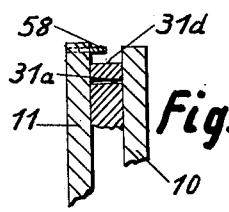

Oct. 9, 1962  H. LÜTHI  3,057,289
STRAPPING APPARATUS
Filed Feb. 21, 1956  10 Sheets-Sheet 7

INVENTOR:
Hans Lüthi
by [signature]
attorney

Oct. 9, 1962  H. LÜTHI  3,057,289
STRAPPING APPARATUS

Filed Feb. 21, 1956  10 Sheets-Sheet 8

INVENTOR:
Hans Lüthi
by (signature)
Attorney

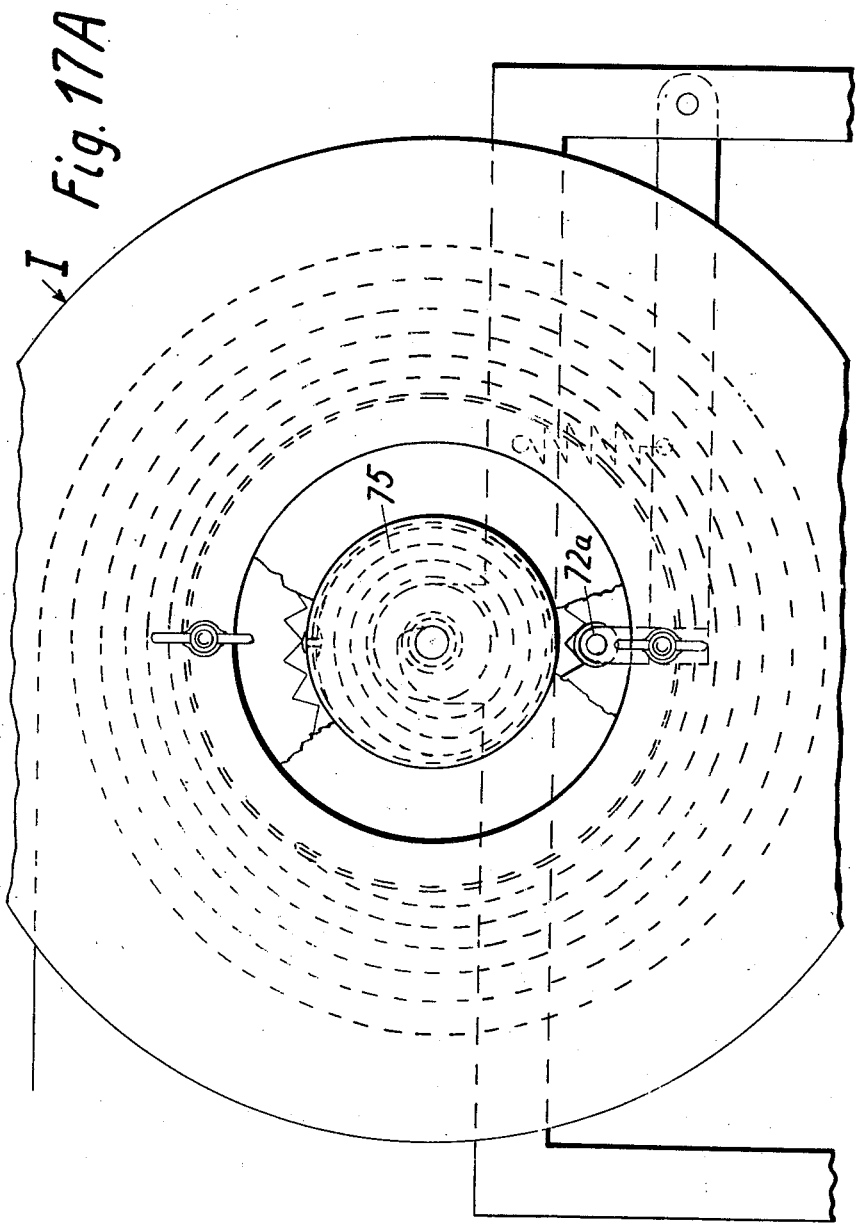

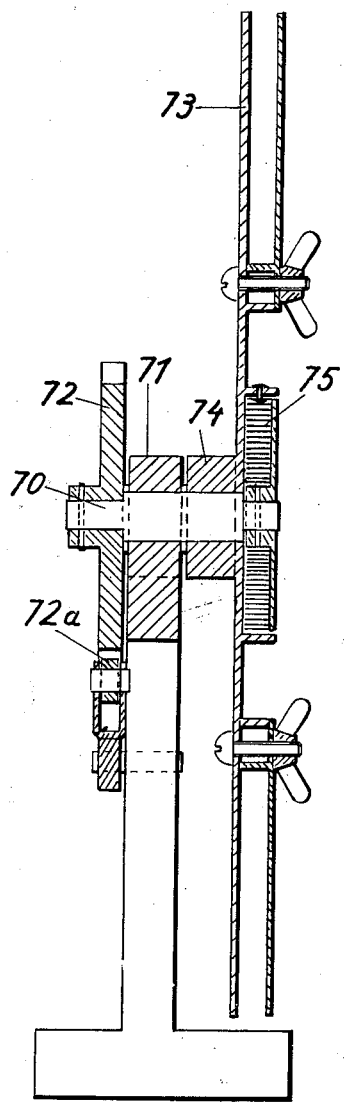

United States Patent Office 3,057,289
Patented Oct. 9, 1962

3,057,289
STRAPPING APPARATUS
Hans Lüthi, Zurich, Switzerland, assignor to Erapa Etablissement fur Rationelle Verpackung und Spedition, Vaduz, Liechtenstein
Filed Feb. 21, 1956, Ser. No. 566,987
Claims priority, application Switzerland Feb. 21, 1955
16 Claims. (Cl. 100—26)

The present invention relates to an apparatus for strapping or baling packages, boxes and the like.

The metallic strap is unwound from a reel, then formed into a loop, the strap end grasped by clamping means, and the loop pulled tight, welded and cut.

An object of the invention is to provide apparatus in which the strapping operation is fully automatic and in which after the strapping material is about the package, it is first tightened by rewinding, the tightened strap on reaching a predetermined initial tension actuating a separate tensioning means which tightens the strap still more to a final tension, the final tension prevailing in the strap, the clamping, cutting and welding operations being cyclically performed, and, on removal of the strapped package from the apparatus, releases the feed reels and prepares the strapping apparatus for the next cycle of operations.

One form of the apparatus according to the invention is shown in the accompanying drawing, in which:

FIG. 4 is a section of the strap-feeding mechanism;

FIGS. 5A and 5B are a plan view and cross-section respectively of the feed-stopping mechanism;

FIGS. 6A and 6B are a plan view and cross-section, respectively, of the locking mechanism;

FIG. 7 is a section through the tensioning mechanism, without the mechanism for preliminary stretching;

FIG. 8 is an enlarged front view of the final or end tensioning mechanism;

FIGS. 16A and 16B is a closing device for the guide channel to hold the strap in position therein, and FIGS. 17A and 17B illustrate the strap supply reel and the manner in which it operates.

Figure 1:
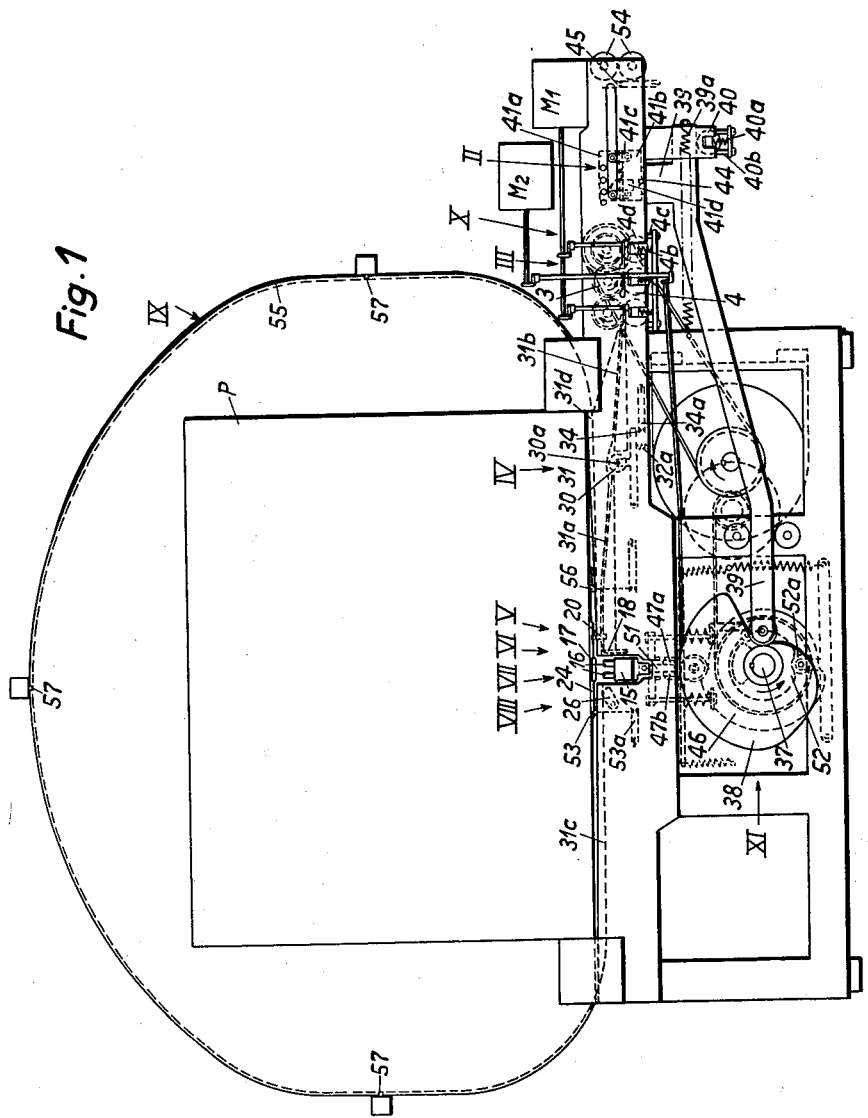
FIG. 1 is a front view of the illustrative embodiment of the apparatus of my invention with the guide ring in normal position.

The apparatus comprises a supply reel (I), a tensioning mechanism (II), a forward and reverse tape feed mechanism (III), a feed-stopping mechanism (IV), a clamping device (V), a cutting device (VI), a welding assembly (VII), a gripping device (VIII), a ring guide (IX), driving gear (X) and control equipment (XI).

The strapping material, in the form of a metal tape, is stored on a reel 73 (FIG. 17B), supported coaxially on shaft 70 rotatably supported in bearing 71. Secured to one end of shaft 70 is a brake drum or ratchet wheel 72. The other end of the shaft projects into tape supply reel 73 which with its bearing 74 likewise can rotate on shaft 70. A spiral spring 75 is firmly attached at one end region to reel 73 and at its other end region to shaft 70. 72a is a ratchet which cooperates with the ratchet wheel 72. Tape from reel 73 is fed to the strapping apparatus proper having at its entrance end a pair of guide rollers 54 (FIGS. 1, 8) supported in a housing.

Adjacent thereto is the tensioning mechanism (II) of which the details are shown in FIGS. 7 and 8. The tensioning mechanism comprises a two-part clamping device consisting of a clamping member 41b and a slide 41a. These two parts are interconnected by means of two pivotable butt straps 41c. Slide 41a is reciprocable between an adjustable stop 43 and a limit switch 45. A draw bar 39 tensioned by a spring 39a cooperates with the clamping member 41b to hold the clamping device open in such manner that the butt straps 41c remain in the vertical position, fixed butt straps 41d being provided which form a rigid stop member. When draw bar 39 moves to the right (FIG. 8) the clamping member 41b is pushed out of its lower position, the butt straps 41c are deflected, and the tape positioned between the members 41a and 41b is tightly gripped. The manner of operation of draw bar 39 and limit switch 45 will be hereinafter discussed in greater detail.

Adjacent the tensioning mechanism (II) is the feed mechanism (III) which includes a clutch wheel 1 (FIG. 4) axially slidable in splines on a shaft 2. 3 is a coupling wheel also mounted on shaft 2 by ball bearings 3b so that it is freely rotatable. By shifting the clutch wheel on shaft 2 toward the coupling wheel 3 it is firmly coupled to the latter. To this end, clutch wheel 1 is provided with claws which engage corresponding claws on coupling wheel 3. Furthermore, the feed mechanism includes a shaft 4a which is radially biased by spring 4b and carries a wheel 4 which is urged by the springs 4b into contact with coupling wheel 3. The strapping tape B passes between the two wheels 3 and 4. Tension screws 4c permit adjustment of the pressure of wheel 4 on tape B. For the purpose of moving the clutch wheel into and out of engagement, there is also provided a suitable lever mechanism, not shown in detail in the drawing, which is actuatable by a magnet M2 (FIG. 1).

Figure 14:
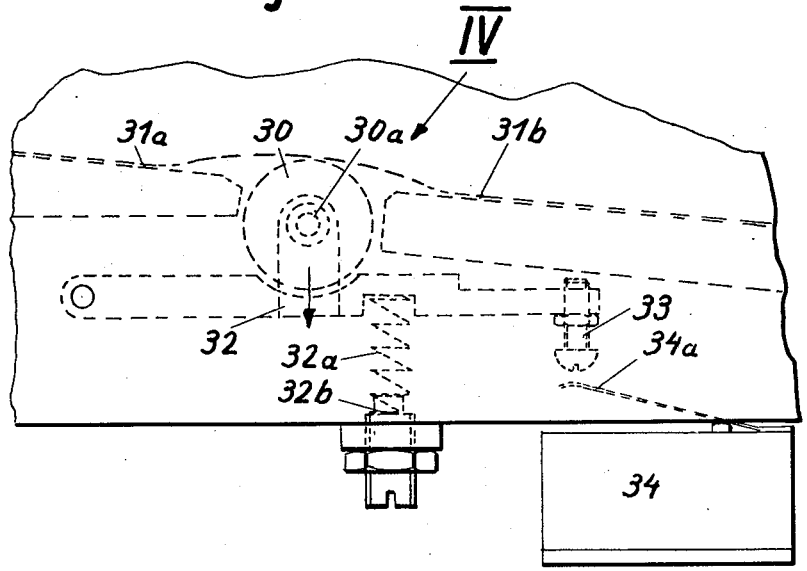
FIG. 14 is an enlarged front view of the feed-stopping mechanism.

The feeding and feed stop mechanism (IV) (FIG. 14) includes a contact roller 30 rotatable about a shaft 30a. The latter is supported on a pivotable arm 32 biased by a spring 32a into the path of the strapping tape. At the free end region of arm 32 switch 34 is positioned so that its movable contact 34a cooperates with a corresponding adjustable contact 33 disposed on arm 32. Spring 32a normally maintains the contacts 34a, 33 separated by urging the arm 32 upwards. So long as these contacts are separated, the energizing circuit of magnet M2, the mode of operation of which will be hereinafter described, is open.

Figure 3:
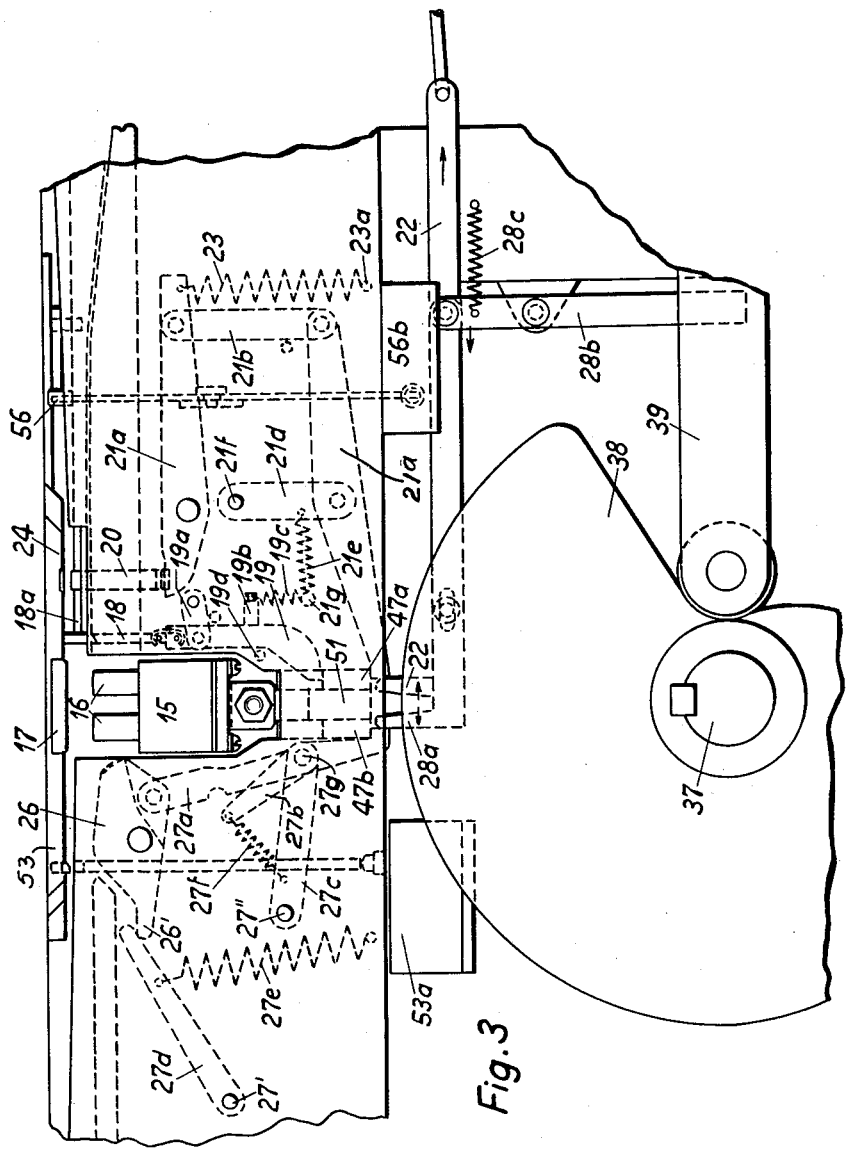
FIG. 3 is an enlarged front view of the gripping means, welding and cutting mechanisms, the tensioning mechanism being omitted.
Figure 13:
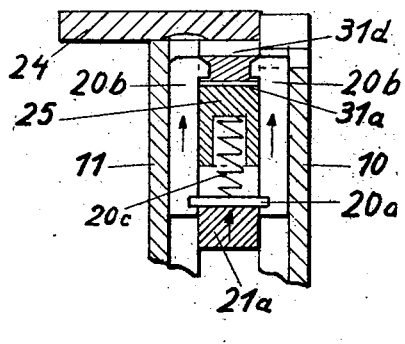
FIG. 13 is a section through the clamping means adjacent the cutting mechanism.

A latch 56, 56b and clamping device (V) are disposed beyond the feeding and feed stop mechanism (IV) in the direction of tape feed, as shown in detail in FIG. 3. The latter includes a gripping member 20 which projects into the path of the tape with its lower end cooperating with one arm of a two-arm lever 21a. The other arm of the latter is pivotally connected to a link 21b which in turn is pivotally connected to a two-arm lever 21c. The latter at about its midregion is pivoted to a swing arm 21d which in turn is pivoted on a fixed pin 21f and is subjected to the action of a tension spring 21e anchored to a stud 21g. The linkage includes another spring 23 acting on the end of lever 21a remote from the gripping member 20. Spring 23 is anchored to a stud 23a. The free end of lever 21c cooperates with another lever 47a in a manner which will be hereinafter described. Details of the gripping member 20 are illustrated in FIG. 13. Member 20 carries the lever 21a which presses against a plate 20a inserted between two claw members 20b. The claw members slide between front and back plates 10 and 11, and are held in position between the plates by an inner spacing block 25. The upper ends of the claw members are in the form of opposed claws in such manner that the gap between the claws is less than the width of the strapping tape. The latter is conducted through a narrow channel 31a, the claws being disposed above this channel but with a second channel 31d above the claws. The top of channel 31d is closed by a cover plate 24 provided with two notches which allow the claw members 20b slightly to deform the tape within channel 31a and to grip it tightly.

Figure 12:
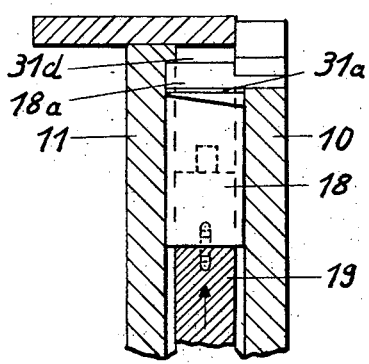
FIG. 12 is a section through the cutting mechanism.

The cutting device (VI) follows the clamping device and is illustrated in greater detail in FIG. 12. It includes a knife 18 for cutting the tape in guide channel 31a. Knife 18 is disposed on a lever 19 and is held slidably in position by the front and rear supporting plates 10 and 11. Lever 19 is supported by the main levers 47a and 47b (FIG. 3) and is guided by an auxiliary pivoted lever 19a. The parts are so disposed that when lever 19 is raised by the vertical movement of the main levers 47a and 47b and these press lever 19 upwardly, knife 18 is moved into contact with a second opposed blade 18a, disposed between the two guide channels 31a and 31d. The end of the cutter lever 19 remote from the knife 18, is curved and carries a laterally projecting lug 19b to which is attached a restoring spring 19c of which the other end is secured to pin 21g.

Figure 9:
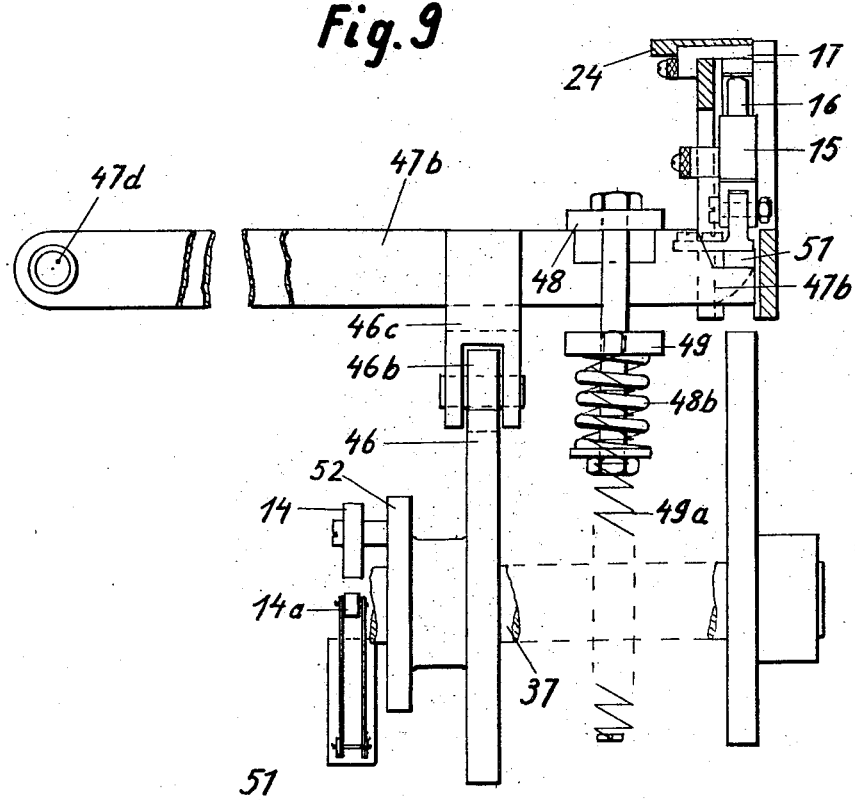
FIG. 9 is a side view of the welding mechanism and the main operating levers.
Figure 10:
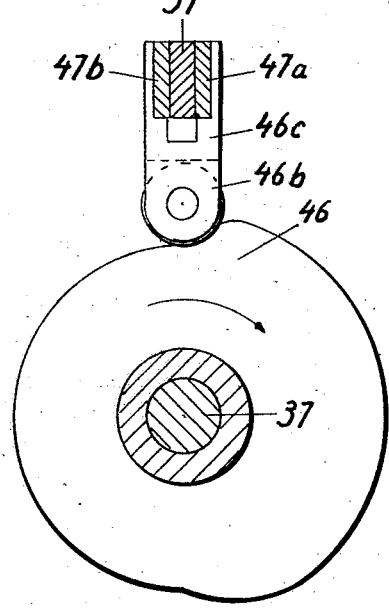
FIG. 10 is a section through the cam and ram for actuating the welding mechanism.
Figure 11:
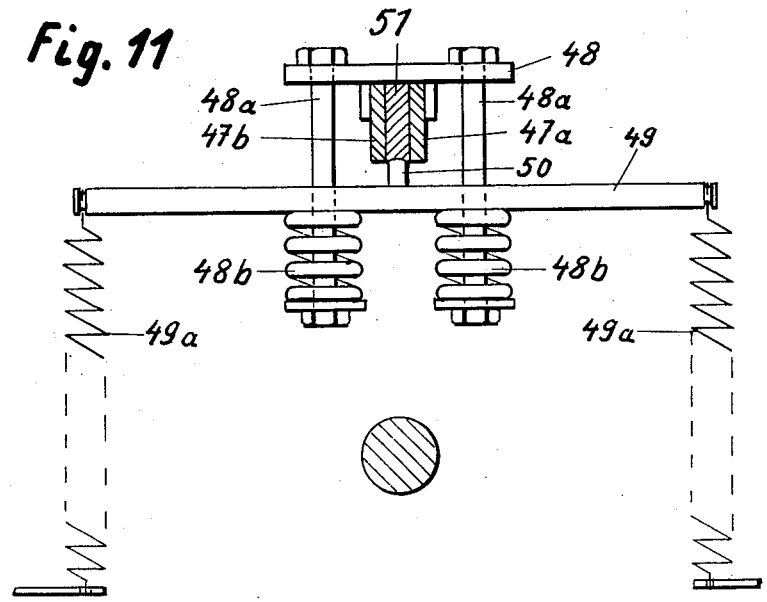
FIG. 11 is a section through the spring system associated with the welding electrode ram.

The welding assembly VII functions in close cooperation with the cutting device VI. Details of the welding assembly are shown in FIGS. 9, 10 and 11.

Arranged between the two main levers 47a, 47b is an electrode ram 51. The two levers 47a, 47b are connected to a double-butt joint 46c carrying a roller 46b. The roller cooperates with a cam 46 which operates in a manner that will be hereinafter described. The main lever arms 47a and 47b are fulcrumed on a pivot pin 47d and are mechanically interconnected by a transverse member 48. The latter carries two rods 48a which in turn carry a cross-beam 49 of which both ends are loaded by tension springs 49a. On the other hand, compression springs 48b are coiled about the rods 48a, on which springs cross-beam 49 bears under the action of the springs 49a. The cross-beam 49 is connected with the welding ram 51 by means of support member 50. An insulated welding electrode 15 is arranged above ram 51. Welding posts 16 extend upwardly from electrode 15 and cooperate with an upper electrode 17 which is mounted in cover plate 24.

Arranged following welding assembly VII (FIG. 3) is the gripping assembly VIII (FIG. 3) which includes a clamping lever 26 centrally fulcrumed and with one end pivotally connected to a link 27a.

The other end 26' of clamping lever 26 cooperates with an arm 27d which is fulcrumed at 27' and urged by a tension spring 27e into contact with the projection of end 26'. The free end of lever 26 is connected to link 27a pivoted on the pin 27g of a bell crank lever 27b. One arm of the latter is biased by a tension spring 27f whereas the other, hook-ended arm engages the lower surface of the main lever 47b. A second link 27c is pivoted at 27" and likewise to pin 27g. The other end of the tension spring 27f is attached to arm 27c.

The gripping assembly also includes a pawl 53 which is illustrated in detail in FIGS. 6A and 6B and is a two-arm lever of which one arm extends across and above the guide channel 31c whereas the other arm is connected with a contact 53a through the intermediary of a push rod 53'. This contact is included in the electrical circuit of magnet M1.

From the gripping assembly the strapping tape is directed to the channelled guide ring 55 (FIG. 1) provided with a plurality of magnets or suction means 57 which positively retain the tape within the ring but permit it to slide along within the channel. In addition, the guide channel incorporates a trip jack 56 of which the construction will be understood by reference to FIGS. 5A and 5B. The jack has a camming nose which projects into the guide channel 31d and is so shaped that the tape passing through the channel deflects it. The jack is also provided with an electric switch 56b in the circuit of magnet M1.

Figure 2:
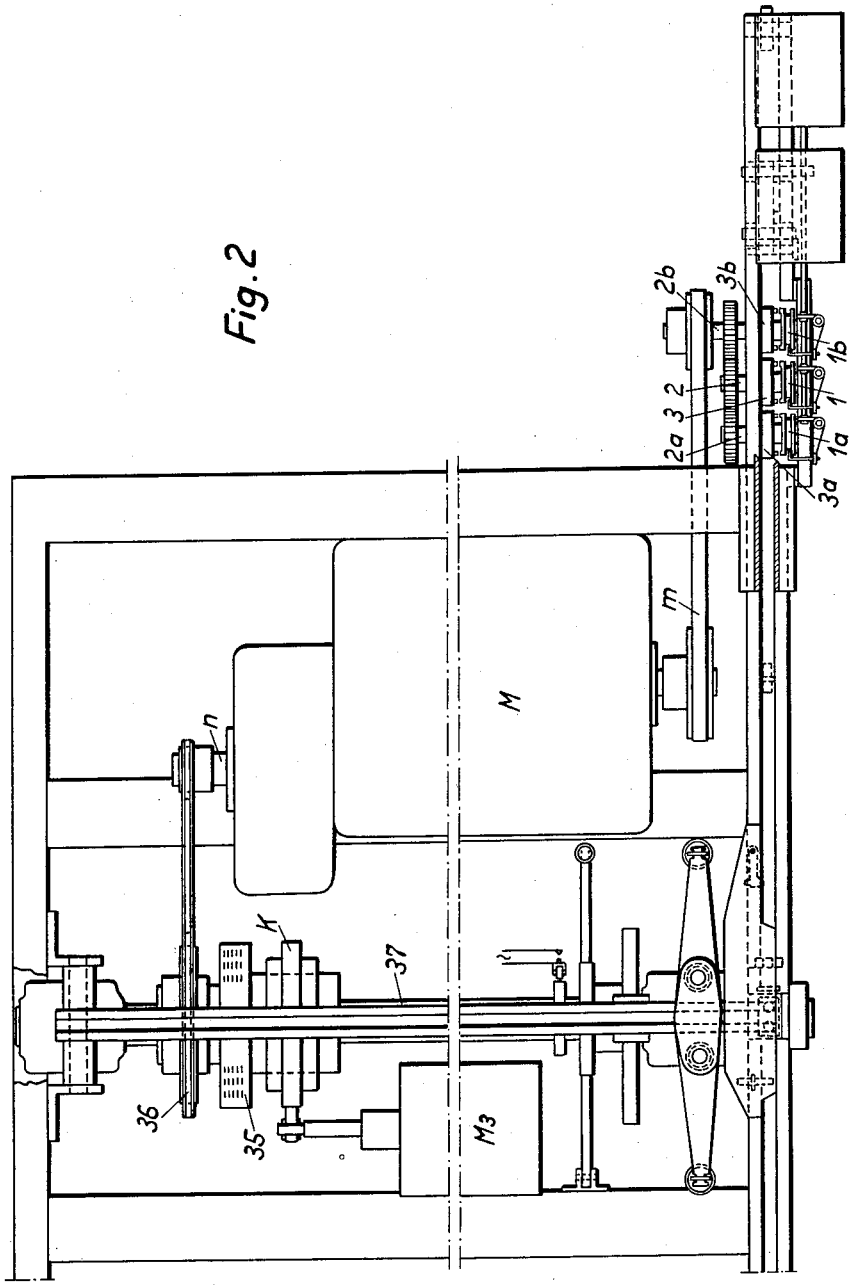
FIG. 2 is a plan view of the apparatus but with details of the welding mechanism and gripping means omitted.

The driving gear X includes a motor M (FIG. 2) which drives a shaft 2b through a V-belt m. This shaft drives a second shaft 2 and a third shaft 2a through a transmission gearing. These three shafts are provided respectively, with clutch wheels 1b, 1 and 1a which can be brought into engagement with their respective associated coupling wheels 3b, 3 and 3a. The clutch wheels are controlled by magnets in a manner yet to be described.

Motor M further drives a shaft 37 through a lay shaft n and through the intermediary of an electromagnetically controlled clutch K which is actuated by a magnet M3.

The control assembly XI comprises two disc cams 38 and 46 (FIGS. 1, 3, 9 and 10). Cam 38 is mounted on the main-shaft 37 and cooperates with the free end of draw-bar 39. Rotation of the cam 38 imparts longitudinal motion to draw-bar 39. Shaft 37 also carries the second cam 46 which rotates together with cam 38 but does not become effective until cam 38 has imparted to draw-bar 39 its maximum axial displacement. Cam 46 (Figs. 9, 10) acts on roller 46b which in turn actuates the twin main levers 47a and 47b through the intermediary of double-butt joint 46c. Finally there is provided a contact roller 14a which cooperates with a cam 14 integral with cam 46.

The operation of the illustrative embodiment of the package strapping apparatus of my invention is as follows:

In the starting position, the strapping tape is inserted into the channelled ring 55 (IX) to form a loop, the leading end of the tape being located in the vicinity of the welding assembly VII. Let it be further assumed that a box P (FIG. 1) has been positioned within the ring.

By operating a starter button, or by means of a photoelectric remote-control mechanism or like means not shown in the drawing, a relay associated with the magnet M2 is energized, and this causes clutch wheel 1 to be axially displaced on shaft 2 into engagement with the stationary coupling wheel 3 so that the latter starts to revolve. The spring-biased wheel 4 on shaft 4a grips the tape by pressing it against wheel 3 and draws the tape back around the package inside the ring. The magnet M2 is connected by mechanical connector 22 (FIG. 3) with lever 21c. Actuation of the magnet causes lever 21c to swing about fulcrum 21f and be displaced, thereby moving link 21b articulated with lever 21a from its stop. The tension of spring 23 now causes gripping member 20 to close on the leading end of the tape and hold it tight. Assemblies III, IV, VI and VIII have not yet come into operation. As soon as the tape has been pulled into contact with the package P, it begins to tauten and to offer some resistance. The portion of the tape between the guide channels 31a and 31b will stretch and thereby displace contact roller 30 downward. The roller in turn deflects contact arm 32 and causes screw contact 33 to close down upon contact 34a of switch 34, which now initiates the cycle of operation of the other assemblies of the machine and at the same time causes further drawing of the tape about the package to be stopped. At this stage, the tape has been preliminarily stretched around the package. The amount of preliminary tension can be controlled by adjusting the set screw 32b and the screw contact 33, by the deflection of spring 32a.

The closure of the contacts 34, 34a, deenergizes magnet M2 so that clutch wheel 1 returns to its initial position and the coupling wheel ceases to draw the tape about the package and simultaneously switch 34 energizes magnet M3 which shifts element 35 of clutch K into engaging working position. Since the clutch K now rotates together with the continuously revolving sprocket 36, shaft 37 now commences to rotate, and cam 38 begins to deflect draw-bar 39 actuating the tensioning mechanism II. The motion of draw-bar 39 pushes clamping member 41b out of its normal position, which, swinging on links 41c presses the tape tightly against the sliding block 41a, the tape being firmly gripped between the two members, as shown in FIG. 8 in dashed lines.

The entire gripping assembly with the strapping tape held tightly therein, is now forced to the right along rail 42 by the longitudinal displacement of draw-bar 39, until the cam-engaging end of the bar reaches the highest point on cam 38. This movement imparts to the strapping tape encircling the package its final tension. The amount of tension imparted to the strapping tape can be controlled by shifting stop 43. By displacing this stop, the stroke of the tensioning assembly will be increased or reduced and the resultant final tension varied accordingly. Draw-bar 39 is held in contact with clamping member 41d by the recess 44 in such manner that in the normal position its cam adjacent end comes into more or less close proximity to the cam. The draw-bar is resiliently held in its normal position by biasing spring 39a, and simultaneously the spring-loaded roller 40 urges bar 39 into contact with clamping member 41b, the force with which the biasing spring 40a acts on roller 40 being adjustable by the setting given to screw 40b. Spring 40a presses with a predetermined force on gripping member 41 by way of roller 40 and draw-bar 39, so that the tying tape is held between the gripping means 41a, 41b, with predetermined force. In addition, spring 40a as compared to the rigid pressing of gripping member 41b by the engagement of the shoulder of bar 39 with groove 44 of the gripping member, assures that on excess of resistance to the displacement of the gripping means in tensioning the tape, the draw bar can leave recess 44 in opposition to the predetermined tension of spring 40a, thereby preventing breaks of either the tape or a machine part due to the otherwise excessive force. Since the clamping members always slide to the same final position, a switch is there disposed for the purpose of controlling the further functional operations of the machine. Thus, when the tensioning assembly reaches the end of its stroke, the leading end of the clamping member 41a closes switch 45, by engaging movable switch arm 45a and moving it to closure, the switch now taking over and maintains magnet M3 energized. At the same time as the final tension is reached, draw-bar 39 mechanically actuates the second clamping device 26 (FIGS. 1 and 3) causing the latter to close and to hold both ends of the fully tensioned strapped tape.

Clamping lever 26 is closed by the operation of linkage 27a . . . 27f. As soon as draw-bar 39 has reached its maximum displacement under the action of cam 38, lever 28b is actuated (FIG. 3) and rod 28a displaced to the left, whereby the hook-end of lever 27b is disengaged. Consequently the tension of spring 27e pulls control arm 27d downwards onto the projecting end 26' of clamping lever 26 which is thus forced to close.

Main lever 47b, together with main lever 47a, is raised by the second cam 46 until the hook-end of lever 27b can reengage the underside of lever 47b under the action of spring 27f. As soon as the two ends of the completely tensioned strap have been joined, main lever 47b returns to its original position, automatically actuating lever 27a, which opens the clamping means 26 through the intermediary of link 27b.

The second cam 46 (FIGS. 1, 9, 10) revolves together with cam 38, but does not become effective, until the latter has reached the point of maximum deflection of draw-bar 39.

Cam 46 cooperates with roller 46b mounted in a shoe 46c which presses on the twin main levers 47a and 47b. As soon as cam 46 raises the two main levers, these lift the entire mechanism. First lever 47a raises lever 19 and causes knife 18 to cut the completed strap from the tape. As the twin levers 47a and 47b rise, lever 19 is pushed upwards, pressing knife 18 against the strap and the latter against the opposite knife blade 18a which, as above stated, is disposed between the guide channels 31d and 31a. As soon as the strap is out from the tape, but before the knife has reached the upper guide channel 31d, the curved part of cutter lever 19 makes contact with a pin 19d, whereby said lever is disengaged from main lever 47a thereby allowing the return spring 19c to retract member 19 down the side of main lever 47a. To ensure that the knife blade, which is otherwise loosely mounted on the head of cutter lever 19, is likewise retracted into its initial position despite any possible frictional resistance, said blade is attached to the head of the lever by means of a hook. As soon as the ends of the strap have been joined and the main levers 47a and 47b returned to their original position, the cutter lever 19 is swung back over the upper face of main lever 47a by return spring 19c and thereby restored to its initial position. By the elevation of the main lever 47a and 47b, the supporting member 50 (FIG. 11) presses against welding electrode ram 51, whereby the free end of the latter and the insulated electrode 15 are raised. The welding posts 16 of the electrode 15 thereby force the overlapping strap ends against cooperating electrode 17 which is held in position by cover-plate 24. Whilst the two main levers 47a and 47b continue their upward movement, the welding mechanism (FIGS. 3 and 9) is held immovable by the pressure of the springs 48b. As soon as main levers 47a and 47b have reached their maximum elevation, switch 14a switches on the welding current. The switch contacts thereof are controlled by cam 14 which also permits the duration of the welding operation to be adjusted. The entire mechanism remains tensioned until cam 46 has completed one revolution. The two main levers 47a and 47b restore to their initial positions under the action of the springs 49a, ram 51 following such lever movement. During their return journey, the two main levers 47a and 47b open the two clamping members 20 and 26.

The cam 38 completes a revolution at the same time as cam 46 and allows draw-bar 39 to be retracted by its return spring 39a. Draw-bar 39 in retracting moves the two clamping members 41a and 41b to engage with the stop 43. Consequently, switch 45 is opened so that magnet M3 disengages clutch member 35 of clutch K from main shaft 37. The latter therefore ceases to rotate and remains in exactly the stop position as determined by auxiliary cam 52 and spring pressed roller 52a.

The entire machine will now remain stopped until trip jack 53 is released by removal of the taped package and the ejection of the strap from welding mechanism VII. The removal of the completed, taped package may be manual or automatic. For this purpose, plate 24 is so constituted, and the unoccupied region between cover plate 24 and the welding ram of such magnitude, that the package inclusive of tape may be pushed away perpendicularly to the length direction of the tape. In so doing, a slight, prior known, loss in tension in the tape about the package occurs. As above stated the trip jack is so designed (FIGS. 6A, 6B) that a two-arm pawl, fulcrumed at its centre, projects with one of its arms across guide channel 31c whereas the other end is connected with switch 53a. When the tape is drawn around the package and becomes taut, the arm projecting into the guide channel is automatically deflected upwardly. The other end of the pawl tilts downwards and opens switch 53a which stops the entire machine with the exception of the mechanisms still operating. As soon as the strapped package is removed, the strap releases the pawl which therefore returns to its initial position, closing contact 53a. The latter energizes the circuit for magnet M1 which brings the clutch wheels 1a, 1 and 1b, which are in continuous rotation into engagement, the effect of energizing magnet M1 being to shift them into engagement with the stationary feed rollers 3a, 3 and 3b which therefore begin to revolve. Since the wheels 4d are spring-biased, they press the tape against the rollers 3b which therefore feed the tape forward. The direction of rotation of the feed wheels is such that they propel the tape into the machine.

The tape which lies in the guide channels 31a and 31b, and of which the leading end is situated at the cutting knife 18, will therefore be propelled through the welding assembly, past clamping lever 26 and through channel 31a, into guide-ring 55. The latter guides the tape around the package to be bound in a loop, whereupon the tape enters guide channel 31d. Before reaching gripping member 20, the leading end of the tape makes contact with pawl 56 which opens a contact and deenergizes the magnet M1, so that the feed wheels 3b stop, owing to the retraction of the coupling wheels 1b. Pawl 56 is so located and contact 56a so adjusted that the leading end of the tape is moved beyond gripping member 20 through the welding assembly. The adjustment is such as to ensure that the end of the still advancing tape always reaches the same terminal position on stopping, despite external influences due to friction, etc.

The final operation performed by the machine is likewise controlled by the trip pawl 56. When the moving tape actuates contact 56a and switch 56b by actuating pawl 56, the circuit for starting the machine into operation is reenergized after a short delay so that the machine is thereby readied for a fresh cycle of operations. After the main starter switch of the machine has once been actuated, the actual operational cycle cannot commence until the above-described tripping action has taken place. It is therefore impossible for a second operational cycle to be entrained before the preceding one has been positively and correctly completed.

Normally the gripping member 20 will be locked in the open position by the linkage 21a, 21b and 21c. Lever 21c is held in engagement with main lever 47a by the retaining spring 21e. When the machine starts and the feed mechanism is set in motion (FIGS. 1 and 2) lever 21c is displaced mechanically by rod 22 actuated by the energization of magnet M2 and thereby disengaged from the main lever 47a. This releases the entire linkage. Main spring 23 abruptly pulls one end of lever 21a downwards, the other lever arm thrusting the gripper 20, affixed to lever 21a, upwards. The gripper action is due to the tape at the gripper being slightly deformed thereby and tightly pressed against the upper cover plate 24. When the tape is welded, main lever 47a is elevated to such an extent that retaining spring 21e again pulls lever 21c back into engagement underneath the main lever. Consequently, the subsequent downward movement of main lever 47a restores lever 21c and the entire actuating linkage of the gripping member, into their initial positions, the gripping member releasing its hold on the completed strap after the weld has been formed. To overcome any undue frictional resistance on opening the gripping member, auxiliary spring 20c is arranged to bear against plate 20a so that the release of the gripping member is positively assured.

When using certain types of strapping materials, the latter may have a tendency of jamming, buckling, or catching in the guide channel 31d after having been pushed round within the guide-ring 55. To prevent this from happening, it may be desirable temporarily to cover the guide-channel 31d with a slidable cover strip 58. FIGS. 16A and 16B show an exemplary form of such an arrangement. When magnet M1 has been energized and caused the tape to be fed into the machine, strip 58 moves into its covering position and remains in the covering position until the tape trips disconnect switch 56. At this moment, strip 58 is retracted and uncovers the guide channel. Movement of the strip 58 into and out of such positions may be effected by mechanical or electrical means.

Figure 15A:
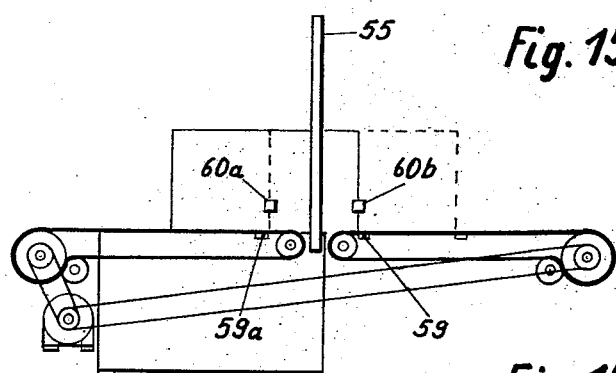
FIGS. 15A and 15B represent a form of remote control for the apparatus without showing details.
Figure 15B:
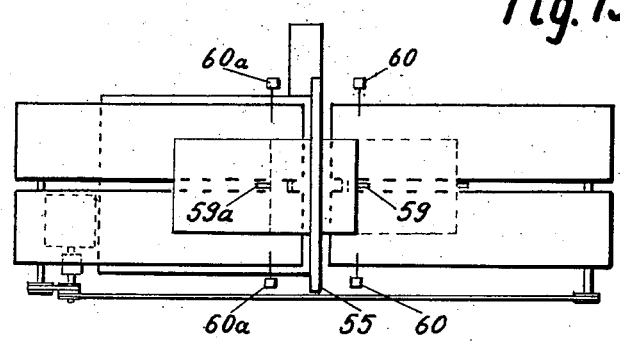

FIGS. 15A and 15B show an illustrative layout for a remote control to operate the machine. These FIGURES of the drawing show a package which is being baled with two strapping tapes. When the package is placed on the machine, a conveyor belt coupled with the machine moves the package into ring 55 until it touches a switch 59, or until it interrupts a light beam which controls a photoelectric cell 60. As a result, an electromagnetic device stops the conveyor so that the package comes to rest. Simultaneously, the machine is put into operation and provides the package with a first strap. At the end of the welding operation and after the main levers 47a and 47b have returned to their normal positions, the magnet controlling the conveyor is reenergized via a switch. Consequently the package moves on. The welded strap is ejected from the welding mechanism, releasing the trip 53 and causing the machine to complete the operational cycle already described. As soon as the package leaves rear contact 59a or clears the beam controlling the photocell 60a, the entire cycle of operations is repeated. Having received the second strap, the package leaves the machine and is replaced by a fresh package. While this conveyor arrangement is preferably electrically coupled with the strapping arrangement per se, it may be provided with its own driving motor as shown in FIGS. 15A and 15B.

In conclusion it should be explained that the strapping tape supply reel is rotated by withdrawal of the tape. The reel initially revolves freely on its shaft 70 until spiral spring 75 is tensioned. The tension of the spiral spring then entrains shaft 70 and rotates it in the same direction. However, since shaft 70 is firmly connected to ratchet wheel 72, the latter starts to function at the same time and allows the strap to be unwound through the machine but prevents an excessive length of strap from unreeling by the intermittent withdrawal pull, while simultaneously preventing the unwinding or slackening of spiral springs 75. In other words, spiral spring 75 remains under tension for as long as strapping tape is withdrawn from the reel or no surplus tape returns thereto. When the machine return feeds strapping tape, the reel is rotated in the opposite direction, since spiral spring 75 tends to unwind. Any surplus tape therefore is automatically rewound.

I claim:

1. An apparatus for applying strapping tapes about packages comprising a channelled guide having a linear portion and a loop portion, the package to be banded being positioned over the linear portion and within the loop portion, the dimensions of the loop portion exceeding the corresponding height and length within the loop portion of the package, a supply of strapping tape, means for feeding and reverse feeding strapping tape into and in the guide from and to the supply, a first tape gripping means for engaging the tape at a region adjacent to its leading end when the guide is filled with tape, a trip pawl extending into the guide for actuating the first gripping means to closure on engagement with the leading end of the tape being fed into the guide at a region beyond the trip pawl in the tape feeding direction, a tape cutting means, a tape welding means, a second tape gripping means for engaging the trailing region of the tape, the cutting, welding and second tape gripping means being positioned beyond the first tape gripping means in the direction of forward feed of tape into the guide, a tape tension responsive means in the path of the tape from the source to the guide, the tape tension responsive means including a roller rotatably supported on a pivotable lever, a spring biasing the lever and the roller toward the tape so that the roller normally deflects the tape from a linear path, a pair of normally open contacts and a source of electrical potential connected to the contacts, one of the pair of contacts being supported at the free end region of the pivotable lever, a third tape gripping means movable longitudinally and located between the tape supply and the tension responsive means, the closure of the pair of contacts of the tape tension responsive means actuating the third gripping means to closure and upon closure moving the third gripping means in the direction to increase the tape tension, and control means for closing the first gripping means and for actuating the tape feed means in the reverse direction to draw tape from the loop portion of the tape-filled guide to encircle the package to be banded and, on the tension of the tape remaining in the linear portion of the guide, on reverse feeding thereof reaching a first predetermined tension to actuate the tension responsive means in turn to close the third gripping means and move it in such direction as to increase the tape tension to a final predetermined higher value, and on attainment of the final tape tension, to cause operation of the second tape gripping means, the cutting and the welding means.

2. A strapping apparatus according to claim 1 in which the force exerted by the spring biasing the roller-supporting lever of the tension responsive means is of such magnitude that the roller deflects the tape from the linear path when the tape is under a tension less than the predetermined first tension and when the tape is tensioned at least equal to the predetermined first tension the contacts of the pair engage each other closing the circuit including the source of electrical potential, and a first and a second electro-magnetic coupling are connected in the circuit and are energized on engagement of the contacts of the pair, the first coupling on energization stopping the reverse feeding rotation of the tape feeding means while the energization of the second coupling actuates means closing the third gripping means and moving the third gripping means in the tape tension increasing direction.

3. An apparatus according to claim 1 in which the third tape gripping means consists of a clamping element and a slide, pivotable straps interconnect the clamping element and the slide, an adjustable stop, a limit switch, the slide being reciprocable between the adjustable stop and the limit switch, a draw bar for normally retaining the third gripping means in open position, and a spring biasing the draw bar to return to its original position when it is displaced therefrom.

4. An apparatus according to claim 1 in which the control means includes a first magnet energizable on closure of the pair of contacts of the tape tension responsive means to drive a main shaft, a first and second cam integrally on the shaft, a draw bar engaging the first cam for actuating the third gripping means to closure and to move the closed third gripping means longitudinally, a roller cooperating with the second cam to actuate the cutting means after the draw bar has been displaced its maximum amount by the first cam.

5. A strapping apparatus according to claim 1 in which the roller cooperating with the second cam is connected to a pair of main levers connected to the knife of the cutting means so that upon movement of the main levers by the second cam the knife is pressed against a counter-knife, and in which the welding means includes a beam disposed between the two main levers, a welding electrode and welding dies both coupled to the welding beam, and a counterelectrode coacting with the electrode and the dies.

6. A strapping apparatus according to claim 5 in which a further cam coacts with the second cam, said further cam energizing and de-energizing the welding electrodes via a switch.

7. A strapping apparatus according to claim 6 in which a second pawl is controlled by the second cam and is connected to one end of a lever pivoted at its midregion and coacting with a connecting lever actuated by the movement of the main levers.

8. A strapping apparatus according to claim 7 in which the second pawl is a lever of which one arm extends across the channel guide and the other arm is connected to a switch, the latter being included in the electrical circuit of a magnet for actuating the feed wheels of the tape feeding means for feeding tape in a forward direction to fill the guide.

9. A strapping apparatus according to claim 8 in which a pawl is provided in the tape path region of the welding and cutting means, said pawl being adapted to actuate a switch included in the main circuit, and a gripper is disposed between said pawl and cutting means in operative connection with the main lever so that upon actuation of the tape feeding means said gripper under spring action seizes the tape end region in the path of movement of the gripper.

10. An apparatus according to claim 1 in which the trip pawl is an arm of a two-armed lever, the trip pawl extending into the guide above the channel of the guide and the tape therein, an electrical switch having a movable arm connected to the other arm of the two-armed lever, and an electrical circuit including means for energizing the tape forward and reverse feeding means in the tape forward feeding direction, the switch being in the circuit, so that on removal of the tape from below the trip pawl when removing the banded package the trip pawl is deflected in such direction to close the switch and circuit energizing the forward feed means to feed replacement tape into the guide.

11. An apparatus according to claim 10 in which the means for feeding tape in the forward and reverse directions is a pair of pressure conveying rollers, the drive means of which is in the circuit of the switch controlled by the trip pawl.

12. Apparatus according to claim 10 in which the tape feeding and reverse feeding means is operated in the forward feeding direction on actuation of the switch by the trip pawl until the leading edge of the feed tape reaches a second pawl, the second pawl being a detent, a pivoted lever, the detent being connected to one end of the lever, and a second electrical switch in an electric circuit controlling the cyclical operation of the apparatus, the pivoting of the detent by the leading edge of the tape actuating the second switch and stopping the forward feed means.

13. Apparatus according to claim 1 in which the first gripping means includes a ram movable substantially perpendicular to the tape in the guide, spring means biasing the ram, a system of levers normally holding the ram spring means tensioned, a formed portion of the guide for receiving the ram when released, and means for suddenly releasing the system of levers holding the ram on filling the guide with tape to propel the ram against a leading region of the tape in the guide opposite the formed portion and correspondingly deform the tape.

14. Apparatus according to claim 1 in which the third gripping means includes a clamp member, a movable carriage member, and a plurality of pivotable links interconnecting the clamp and carriage members, and is longitudinally movable between an adjustable first stop and a predetermined fixed second stop, a first spring biasing the gripping member toward the adjustable stop and a second spring biasing the carriage toward the clamp member.

15. An apparatus according to claim 1 in which the trip pawl is located in the linear portion of the channel guide, a cover plate is positioned to close the upper open region of the guide linear portion but spaced from one lateral wall of the guide a distance sufficient to permit the withdrawal of the welded portion of the tape banding the package forwardly and upwardly through the space so defined, the trip pawl is an arm of a two-armed lever and extends into the guide immediately above the tape in the channel of the guide, a normally open switch having its movable arm connected to the other arm of the two-armed lever, and an electrical circuit including the switch and means for energizing the tape forward and reverse feed means in the tape forward feed direction so that on removal of the tape banded about the package through the space so defined the pawl drops downwardly moving the other arm of the two-armed lever upwardly to close the switch actuating the tape forward feed means.

16. An apparatus according to claim 15 in which the two armed lever is so pivoted that when the first predetermined tape tension is reached, the trip pawl is deflected upwardly by the tape moving the other end of the arm downwardly thereby opening the switch and stopping the tape reverse feeding means.

References Cited in the file of this patent

UNITED STATES PATENTS

| | | |
|---|---|---|
| 1,650,843 | McChesney | Nov. 29, 1927 |
| 2,085,082 | Delany | June 29, 1937 |
| 2,575,899 | Vining et al. | Nov. 20, 1951 |
| 2,597,675 | Sackett | May 20, 1952 |
| 2,599,427 | Bellingher | June 3, 1952 |
| 2,604,831 | Fraenckel | July 29, 1952 |
| 2,614,487 | Cheesman | Oct. 21, 1952 |
| 2,707,429 | Leslie et al. | May 3, 1955 |
| 2,831,422 | Black et al. | Apr. 22, 1958 |
| 2,853,938 | Hall et al. | Sept. 3, 1958 |
| 2,882,814 | Winkler et al. | Apr. 22, 1959 |

FOREIGN PATENTS

| | | |
|---|---|---|
| 731,288 | Great Britain | June 8, 1955 |